United States Patent
Cheng et al.

(10) Patent No.: US 11,442,243 B2
(45) Date of Patent: Sep. 13, 2022

(54) HEAD MOUNTED DISPLAY DEVICE

(71) Applicant: HTC Corporation, Taoyuan (TW)

(72) Inventors: Yen-Fang Cheng, Taoyuan (TW); Iok Kan Choi, Taoyuan (TW); Qing-Long Deng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 174 days.

(21) Appl. No.: 16/920,766

(22) Filed: Jul. 6, 2020

(65) Prior Publication Data

US 2021/0141190 A1 May 13, 2021

Related U.S. Application Data

(60) Provisional application No. 62/931,809, filed on Nov. 7, 2019.

(51) Int. Cl.
*G02B 7/182* (2021.01)
*G02B 27/00* (2006.01)
*G02B 5/09* (2006.01)
*G02B 30/10* (2020.01)

(52) U.S. Cl.
CPC .............. *G02B 7/182* (2013.01); *G02B 5/09* (2013.01); *G02B 27/0093* (2013.01); *G02B 30/10* (2020.01)

(58) Field of Classification Search
CPC ...... G02B 7/182; G02B 5/09; G02B 27/0093; G02B 30/10; G02B 2027/0138; G02B 2027/014; G02B 2027/015; G02B 2027/0161; G02B 27/0172; G02B 27/0101; G06F 3/013
USPC .......................................................... 359/850
See application file for complete search history.

(56) References Cited

U.S. PATENT DOCUMENTS

| | | | |
|---|---|---|---|
| 6,353,503 B1* | 3/2002 | Spitzer | G02B 27/017 359/630 |
| 9,910,257 B2* | 3/2018 | Ward | G02B 21/361 |
| 2008/0278800 A1* | 11/2008 | Widmer | G02B 21/22 359/376 |

(Continued)

FOREIGN PATENT DOCUMENTS

| CN | 106796354 | 5/2017 |
|---|---|---|
| CN | 108461038 | 8/2018 |

(Continued)

OTHER PUBLICATIONS

"Office Action of Taiwan Counterpart Application", dated Feb. 24, 2021, p. 1-p. 5.

(Continued)

*Primary Examiner* — Stephone B Allen
*Assistant Examiner* — Rahman Abdur
(74) *Attorney, Agent, or Firm* — JCIPRNET

(57) ABSTRACT

The head mounted display device includes a tube, a reflecting mirror, an infrared camera, and an imaging lens. The reflecting mirror is arranged in the tube. The reflecting mirror has a first plane and a second plane connected in sequence, wherein the first plane and the second plane have normal vectors that are not parallel to each other. The infrared camera receives the reflected image beam from the second plane of the reflecting mirror, wherein the second plane of the reflecting mirror receives the image beam to generate the reflected image beam. The imaging lens is arranged at the first open end of the tube.

7 Claims, 4 Drawing Sheets

(56) References Cited

U.S. PATENT DOCUMENTS

2009/0059363 A1* 3/2009 Straehle .................. G02B 21/22
  359/389
2015/0077312 A1* 3/2015 Wang ....................... G09G 3/02
  345/7
2019/0339527 A1* 11/2019 Zhang ................ G02B 27/0172

FOREIGN PATENT DOCUMENTS

| CN | 209117975 | 7/2019 |
| TW | I659229 | 5/2019 |

OTHER PUBLICATIONS

Office Action of China Counterpart Application, dated May 31, 2022, pp. 1-6.

\* cited by examiner

HEAD MOUNTED DISPLAY DEVICE

CROSS-REFERENCE TO RELATED APPLICATION

This application claims the priority benefit of U.S. provisional application Ser. No. 62/931,809, filed on Nov. 7, 2019. The entirety of the above-mentioned patent application is hereby incorporated by reference herein and made a part of this specification.

BACKGROUND

Field of the Disclosure

The disclosure relates to a head mounted display device, and particularly to a head mounted display device that can shorten the space of a tube.

Description of Related Art

With the advancement of electronic technology, people demand for better displaying effects. Under the circumstances, a head mounted display device capable of exhibiting stereoscopic visual effect has been launched.

In the head mounted display technology, in order to provide users with high-quality stereoscopic images, typically an eye tracker is provided in the head mounted display device. The eye tracker is configured to track the position state of the user's eyeball, so that the head mounted display device can properly adjust the provided visual image according to the position state of the user's eyeball.

In the eye tracker developed by conventional technology, it is often necessary to provide a reflecting mirror to reflect a light beam, so that the light beam can be projected onto the eyeball to perform the eyeball tracking action. Since this reflecting mirror needs to be configured in a tube at a certain angle, the tube needs to be designed with a certain length. As such, when it is required to reduce the size of the head mounted display device, the length of the tube is often insufficient for configuring the reflecting mirror to be set at a proper angle, which causes difficulties in design.

SUMMARY OF THE DISCLOSURE

The disclosure provides a head mounted display device, which can shorten the required thickness of a tube.

The head mounted display device of the disclosure includes a tube, a reflecting mirror, an infrared camera, and an imaging lens. The reflecting mirror is arranged in the tube and has a first plane and a second plane connected in sequence, wherein the first plane and the second plane respectively have non-parallel normal vectors. The infrared camera receives the reflected image beam from the second plane of the reflecting mirror, wherein the second plane of the reflecting mirror receives the image beam to generate the reflected image beam. The imaging lens is arranged at the first open end of the tube.

Based on the above, the disclosure configures the reflecting mirror in the tube in a bent manner. In this way, in the head mounted display device, the thickness of the tube can be reduced, and the overall thickness of the head mounted display device can be reduced.

DESCRIPTION OF EMBODIMENTS

Figure 1:
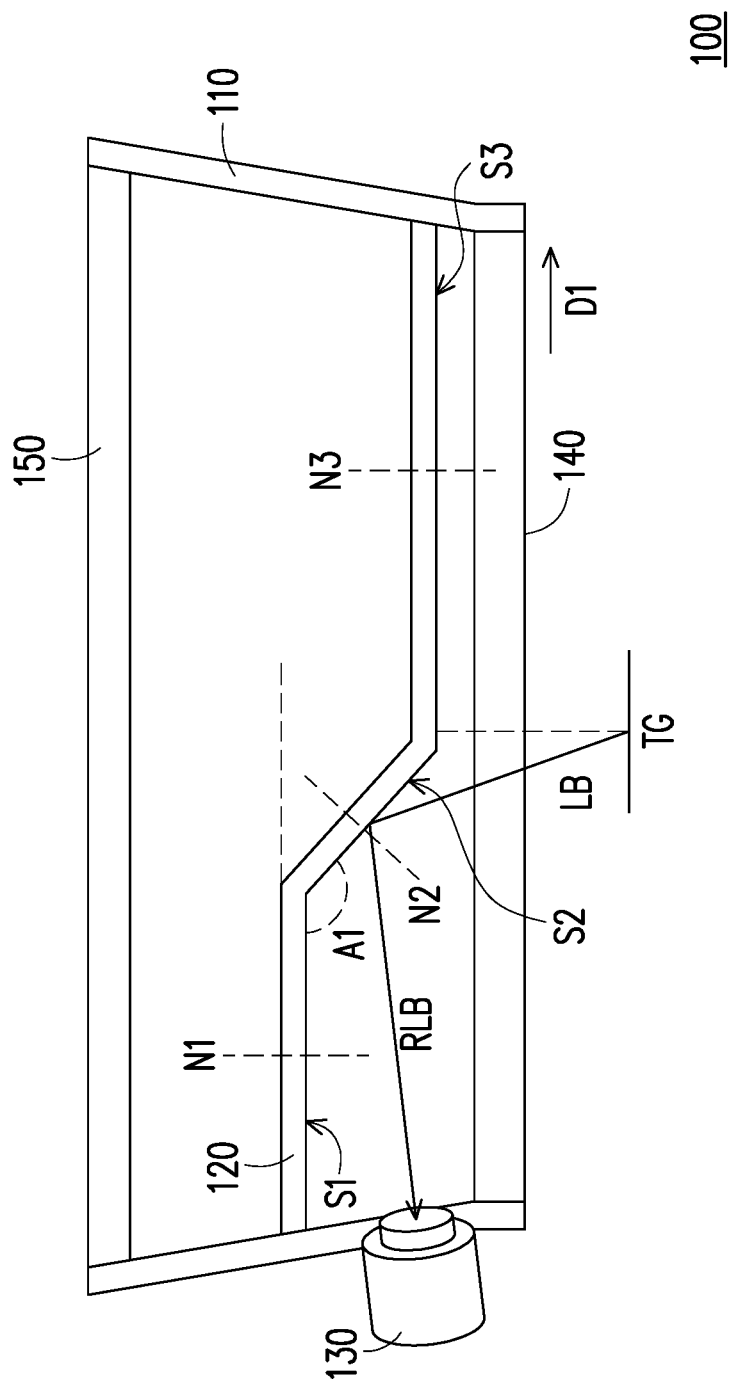
FIG. 1 is a schematic view of a head mounted display device according to an embodiment of the disclosure.

Please refer to FIG. 1. FIG. 1 is a schematic view of a head mounted display device according to an embodiment of the disclosure. The head mounted display device 100 includes a tube 110, a reflecting mirror 120, an infrared camera 130, an imaging lens 140, and a display 150. The reflecting mirror 120 is disposed in the tube 110 and has a first plane S1, a second plane S2, and a third plane S3 connected in sequence. The first plane S1, the second plane S2, and the third plane S3 have normal vectors N1, N2, and N3, respectively, wherein the normal vectors N1 and N2 are not parallel to each other.

In addition, in the embodiment of FIG. 1, the normal vectors N2 and N3 are not parallel to each other.

In this embodiment, an angle A1 is formed between the first plane S1 and the second plane S2 of the reflecting mirror 120. Specifically, the angle A1 may be smaller than or equal to 160 degrees, and the angle A1 may be larger than 90 degrees. The angle A1 prevents distortion of the image from the display 150. The second plane S2 of the reflecting mirror 120 is configured to receive the image beam LB from the target region TG, and generate the reflected image beam RLB through reflecting the image beam LB. The second plane S2 of the reflecting mirror 120 causes the reflected image beam RLB to be transmitted to the infrared camera 130 to obtain the image in the target region.

Additionally, in this embodiment, the normal vectors N1 and N3 of the first plane S1 and the third plane S3 respectively may or may not be parallel to each other, and the disclosure provides no limitation thereto.

The reflecting mirror 120 in the embodiment of the disclosure may be implemented by using soft glass. By configuring soft glass in the tube 110, it is possible to prevent the reflecting mirror 120 from being seen by the human eye and reduce the possibility of interference to visual effect, thereby improving visual quality.

On the other hand, the infrared camera 130 may be disposed on the tube 110. In addition, one or more infrared emitters may be provided in the head mounted display device 100, and configured to project one or more infrared beams to the target region TG. In this embodiment, the image with an infrared light point in the target region TG can be projected onto the second plane S2 of the reflecting mirror 120 through the image beam LB. The second plane S2 of the reflecting mirror 120 reflects the image beam LB so as to project the reflected image beam RLB to the infrared camera 130. In this way, the infrared camera 130 can acquire the image with the infrared light point in the target region TG.

In the embodiment, the reflecting mirror 120 cooperates with the infrared camera 130 to form an eye tracker in the head mounted display device 100. The target region TG of the head mounted display device 100 may correspond to the position of the user's eyeball. The infrared camera 130 can acquire images of infrared light point on the user's eyeball and the iris of the eyeball. In this manner, the head mounted display device 100 can calculate the position state of the user's eyeball EB through the distribution state and position state of the infrared light point on the iris of the eyeball, and complete the eyeball tracking action.

In this embodiment, the imaging lens 140 and the display 150 are respectively disposed at two opposite open ends of the tube 110. Specifically, the imaging lens 140 is disposed between the target region TG and the reflecting mirror 120. In addition, the reflecting mirror 120 is a partial reflecting mirror for reflecting light beams in a certain wavelength range. In this embodiment, the reflecting mirror 120 can reflect the infrared beam reflected by the user's eyeball.

Therefore, the image beam generated by the display 150 can pass through the reflecting mirror 120 and be transmitted to the target region TG through the imaging lens 140. The reflecting mirror 120 can reflect the image beam LB in the target region TG and transmit the reflected image beam RLB to the infrared camera 130.

It is worth mentioning that, in the embodiment of the disclosure, the reflecting mirror 120 is a flexible reflecting mirror. By bending the reflecting mirror 120 such that it has at least the first plane S1 and the second plane S2, it is possible to effectively reduce the space for configuring the reflecting mirror 120 in the tube 110. That is to say, the thickness required by the tube 110 (the distance between the first open end and the second open end) can be reduced to further reduce the thickness of the head mounted display device 100.

In the embodiment of the disclosure, the thickness of the reflecting mirror 120 may be smaller than 0.2 mm. Moreover, when the thickness of the reflecting mirror 120 is 0.07 mm, the refractive index of the reflecting mirror 120 may be less than or equal to 2.

As can be obtained from the above description, in the embodiment of the disclosure, the size of the tube 110 can be further reduced by reducing the thickness of the reflecting mirror 120.

On the other hand, the display 150 is configured to generate a display image, and make the display image be projected to the user's eyeball through the reflecting mirror 120 and the imaging lens 140, thereby generating a virtual reality (VR) display effect. Furthermore, the display 150 can also choose to provide real-time images and virtual images simultaneously to generate augmented reality (AR) or mixed reality (MR) display effects.

In the embodiment of the disclosure, the display 150 can be implemented in the form of any display, such as a liquid crystal display, an organic light emitting diode display, a micro light emitting diode display, or other displays commonly known to those skilled in the art.

It is worth mentioning that, in the embodiment of the disclosure, the bending shape of the reflecting mirror 120 can be adjusted. Specifically, for different designs of the head mounted display device 100, the thickness of the tube 110 may have many different variations. The reflecting mirror 120 can be bent in different ways according to the thickness of the tube 110 so as to be accommodated in the tube 110. The main purpose is that the bent reflecting mirror 120 can provide a sufficiently large incident angle for the image beam LB on the second plane S2 of the middle part, effectively generate the reflected image beam RLB, and allow the reflected image beam RLB to be transmitted to infrared camera 130.

In addition, the imaging lens 140 may be constructed by a lens group formed by one or more lenses. The imaging lens 140 in this embodiment may be constructed according to any lens group known to those skilled in the art, and the disclosure provides no limitation thereto.

In this embodiment, the first plane S1 and the third plane S3 of the reflecting mirror 120 may be parallel with the imaging lens 140 in the extending direction D1 at the open end of the tube 110 (normal vectors N1 and N3 are perpendicular to the direction D1).

Figure 2A:
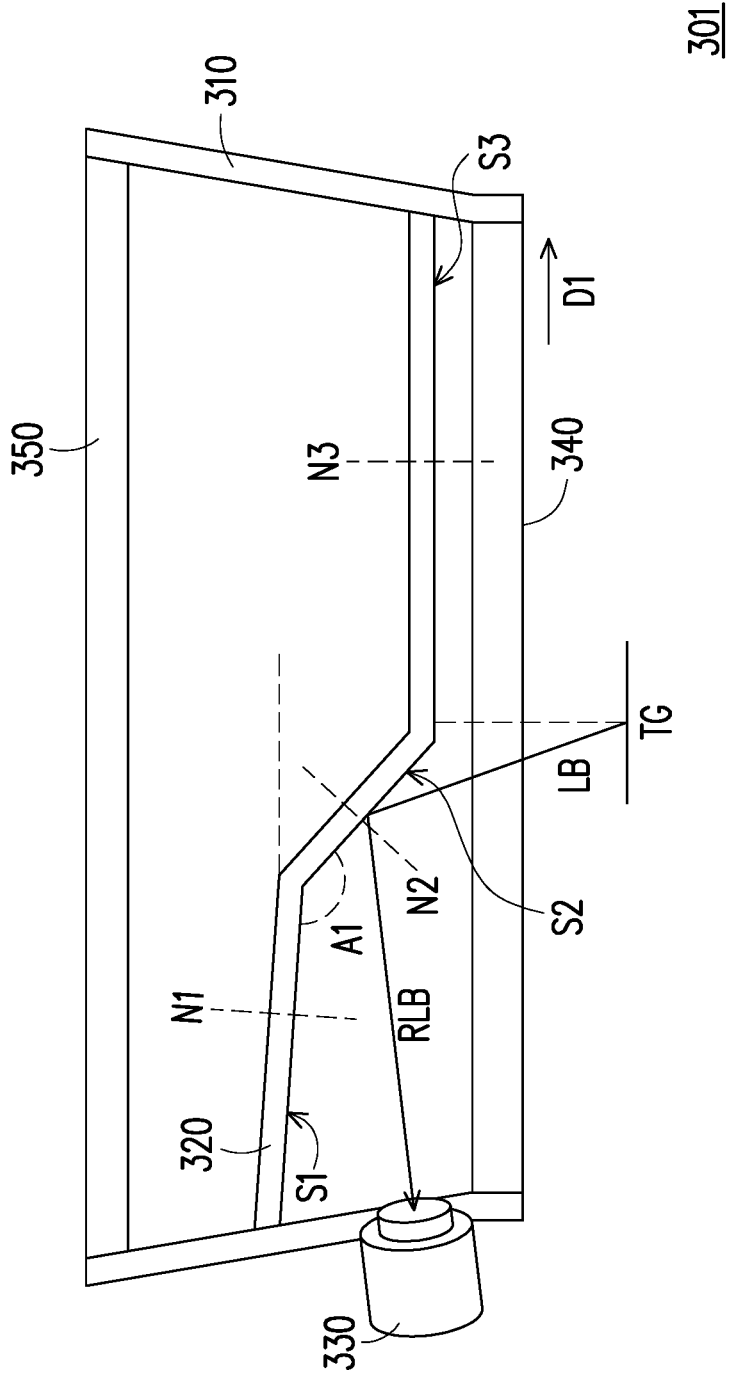
FIG. 2A to FIG. 2C are schematic views illustrating various configurations of the reflecting mirror in the head mounted display device according to the embodiments of the disclosure.
Figure 2B:
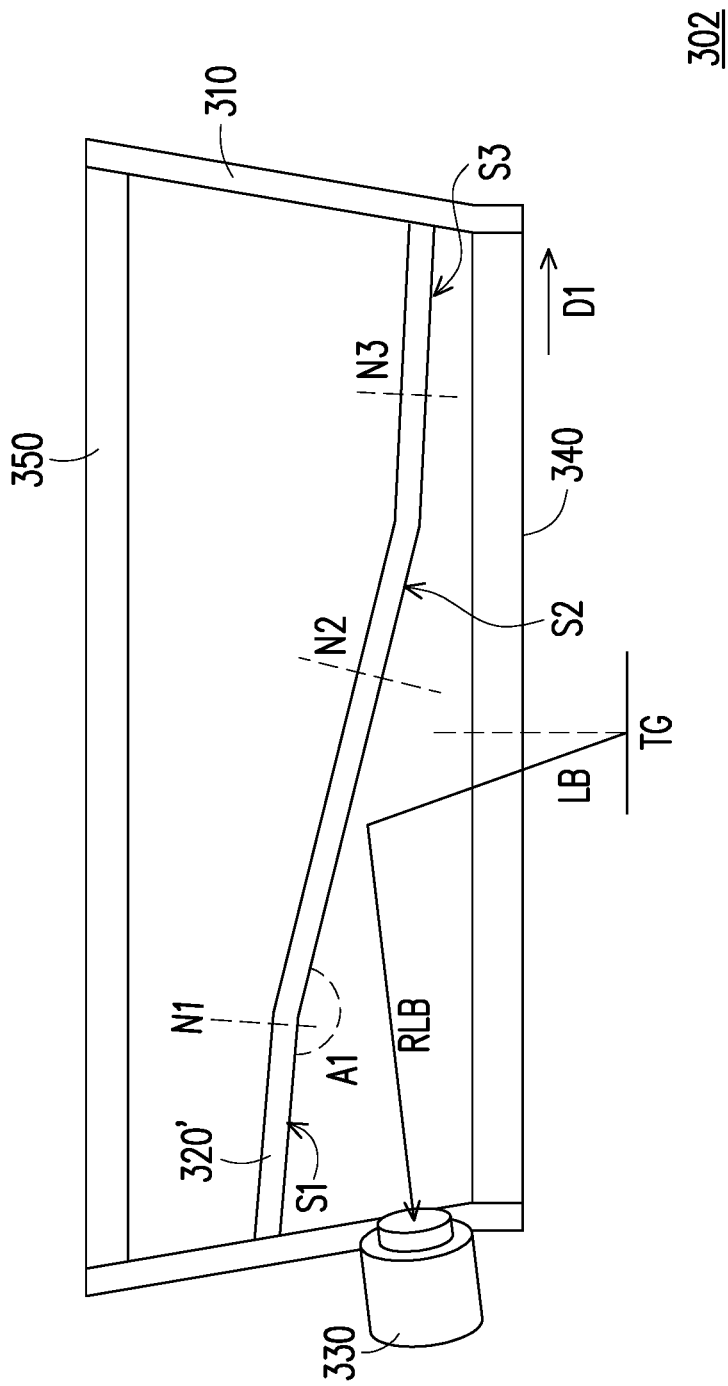
Figure 2C:
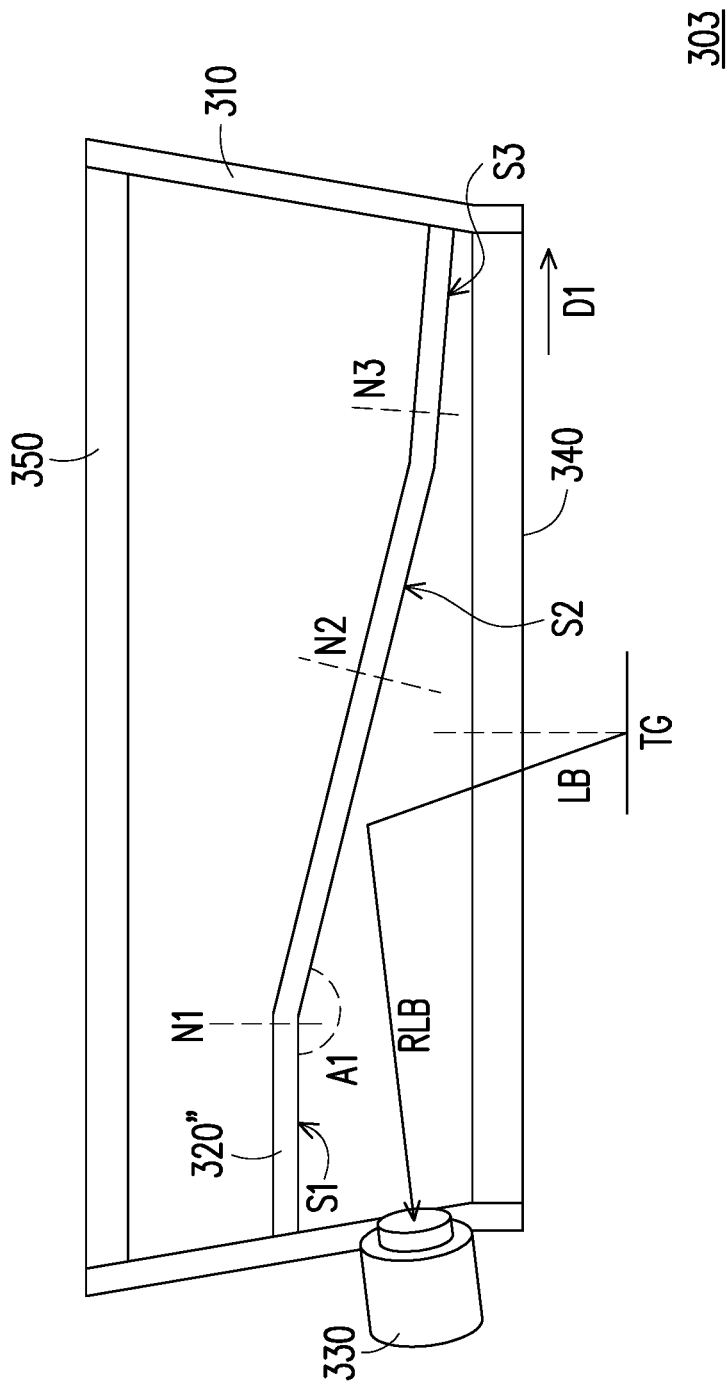

Please refer to FIG. 2A to FIG. 2C. FIG. 2A to FIG. 2C are schematic views illustrating various configurations of the reflecting mirror in the head mounted display device according to the embodiments of the disclosure. In FIG. 2A, the head mounted display device 301 includes a tube 310, a reflecting mirror 320, an infrared camera 330, an imaging lens 340, and a display 350. The reflecting mirror 320 is disposed in the tube 310, and has a first plane S1, a second plane S2, and a third plane S3 connected in sequence. The imaging lens 340 and the display 350 are respectively disposed at two opposite open ends of the tube 310. The infrared camera 330 may be disposed on the tube 310 and receive the reflected image beam RLB. The second plane S2 of the reflecting mirror 320 is configured to reflect the image beam LB from the target region TG to generate the reflected image beam RLB, and project the reflected image beam RLB to the infrared camera 330.

In this embodiment, any two of the normal vectors N1 to N3 of the first plane S1, the second plane S2, and the third plane S3 are not parallel to each other. Specifically, the third plane S3 may be parallel with the imaging lens 340 in the extending direction D1 at the open end of the tube 310 (the normal vector N3 is perpendicular to the direction D1), and both the first plane S1 and the second plane S2 are not parallel with the direction D1 (both the normal vectors N1 and N2 are not perpendicular to the direction D1).

In FIG. 2B, the head mounted display device 302 includes a tube 310, a reflecting mirror 320', an infrared camera 330, an imaging lens 340, and a display 350. The reflecting mirror 320' is disposed in the tube 310, and has a first plane S1, a second plane S2, and a third plane S3 connected in sequence. The imaging lens 340 and the display 350 are respectively disposed at two opposite open ends of the tube 310. The infrared camera 330 may be disposed on the tube 310 and receive the reflected image beam RLB. The second plane S2 of the reflecting mirror 320 is configured to reflect the image beam LB to generate the reflected image beam RLB, and project the reflected image beam RLB to the infrared camera 330.

In this embodiment, any two of the normal vectors N1 to N3 of the first plane S1, the second plane S2, and the third plane S3 are not parallel to each other. Moreover, the first plane S1, the second plane S2, and the third plane S3 are not parallel with the imaging lens 340 in the extending direction D1 at the open end of the tube 310 (the normal vectors N1, N2, N3 are not perpendicular with the direction D1).

In FIG. 2C, the head mounted display device 303 includes a tube 310, a reflecting mirror 320", an infrared camera 330, an imaging lens 340, and a display 350. The reflecting mirror 320" is disposed in the tube 310, and has a first plane S1, a second plane S2, and a third plane S3 connected in sequence. The imaging lens 340 and the display 350 are respectively disposed at two opposite open ends of the tube 310. The infrared camera 330 may be disposed on the tube 310 and receive the reflected image beam RLB. The second plane S2 of the reflecting mirror 320 is configured to reflect the image beam LB to generate the reflected image beam RLB.

In the embodiment, any two of the normal vectors N1 to N3 of the first plane S1, the second plane S2, and the third plane S3 are not parallel to each other. Specifically, the first plane S1 may be parallel with the imaging lens 340 in the extending direction D1 at the opening end of the tube 310 (the normal vector N1 is perpendicular to the direction D1), and both the second plane S2 and the third plane S3 are not parallel with the direction D1 (the normal vectors N2 and N3 are not perpendicular to the direction D1).

Incidentally, in the embodiment of the disclosure, the size of the second plane S2 can be set according to the size of the distribution area of the light beam LB, the disclosure provides no limitation thereto. In addition, the disclosure also provides no limitation to the dimensional relationship between the first plane S1, the second plane S2, and the third plane S3.

In summary, in the disclosure, a curved reflecting mirror is provided in the head mounted display. Under the condition of not accounting for too much thickness of the tube, the reflecting mirror provides a proper reflection angle for the image beam that performs eyeball detecting operation, so as to project the reflected image beam into the infrared camera. The reflecting mirrors with different degrees of curvature can be applied to head mounted displays with tubes of different thicknesses. In this way, the thickness of the head mounted display can be effectively reduced, improving the convenience of use.

What is claimed is:

1. A head mounted display device, comprising:
   a tube;
   a reflecting mirror, disposed in the tube, having a first plane a second plane and a third plane connected in sequence, wherein the first plane and the second plane respectively have normal vectors that are not parallel to each other, and a normal vector of the third plane is not parallel with the normal vector of the second plane;
   an infrared camera that receives a reflected image beam from the second plane of the reflecting mirror,
   wherein the second plane of the reflecting mirror receives an image beam to generate the reflected image beam, and an included angle between the image beam and the reflected image beam is larger than 90 degrees; and
   an imaging lens arranged at a first open end of the tube.

2. The head mounted display device according to claim 1, wherein the normal vector of the third plane and the normal vector of the first plane are parallel to each other.

3. The head mounted display device according to claim 1, wherein an angle between the first plane and the second plane is smaller than or equal to 160 degrees.

4. The head mounted display device according to claim 1, wherein the reflecting mirror is a flexible reflecting mirror.

5. The head mounted display device according to claim 1, wherein a thickness of the reflecting mirror is smaller than 0.2 mm.

6. The head mounted display device according to claim 1, wherein when a thickness of the reflecting mirror is 0.07 mm, a refractive index of the reflecting mirror is smaller than or equal to 2.

7. The head mounted display device according to claim 1, further comprising:
   a display disposed at a second open end of the tube, wherein the first open end is opposite to the second open end.

* * * * *